United States Patent [19]

Fortune

[11] Patent Number: 5,059,769
[45] Date of Patent: Oct. 22, 1991

[54] REPLACEABLE SOLDERING TIP ASSEMBLY

[76] Inventor: William S. Fortune, 29866 Cuthbert St., Malibu, Calif. 90265

[21] Appl. No.: 660,351

[22] Filed: Feb. 22, 1991

[51] Int. Cl.⁵ .......................... B23K 3/02; H05B 1/02; H05B 3/00
[52] U.S. Cl. .................................. 219/238; 219/239; 219/241; 228/51
[58] Field of Search ............... 219/221, 227, 229, 230, 219/236–241; 228/51-55

[56] References Cited

U.S. PATENT DOCUMENTS

| | | | |
|---|---|---|---|
| 2,224,583 | 12/1940 | Abbott | 219/239 |
| 2,665,365 | 1/1954 | Thomas | 219/239 |
| 3,646,577 | 2/1972 | Ernst | 219/241 |
| 3,899,114 | 8/1975 | Kleeberg | 219/238 x |
| 3,919,524 | 11/1975 | Fortune | 219/238 |
| 4,463,247 | 7/1984 | Lawrence | 219/239 X |
| 4,734,559 | 3/1988 | Fortune et al. | 219/238 |

FOREIGN PATENT DOCUMENTS

| | | | |
|---|---|---|---|
| 54-4260 | 1/1979 | Japan | 219/237 |
| 828004 | 2/1960 | United Kingdom | 219/238 |
| 2064396 | 6/1981 | United Kingdom | 219/237 |
| 2148676 | 5/1985 | United Kingdom | 219/241 |

Primary Examiner—Anthony Bartis
Attorney, Agent, or Firm—Daniel T. Anderson

[57] ABSTRACT

A metallic soldering tip is disclosed having a forward, outer retaining rim and a rear inwardly tapered skirted end of the character to be fitted loosely over a ceramic rod heating element. The tip is axially slotted from its rear edge to a point forward of the retaining rim. An inner sheath over the rear portion of the ceramic rod has a flared forward end which engages the tapered skirted end of the soldering tip while the reduced diameter forward end of an outer retaining sheath engages the retaining rim of the soldering tip and is drawn forcefully rearwardly by a retaining nut threaded onto the handle or body of the soldering implement. The rearward displacement of the outer sheath forces the slotted skirted portion of the soldering tip to press inwardly against the ceramic heating element by virtue of the tapered relation between the inner sheath, the rear of the soldering tip, retaining rim and the forward end of the outer retaining sheath. Thusly, otherwise a loose fitting soldering tip may be caused to be snugly fitting over the heater element without axially scraping or abrasion during the removal or replacement steps.

3 Claims, 2 Drawing Sheets

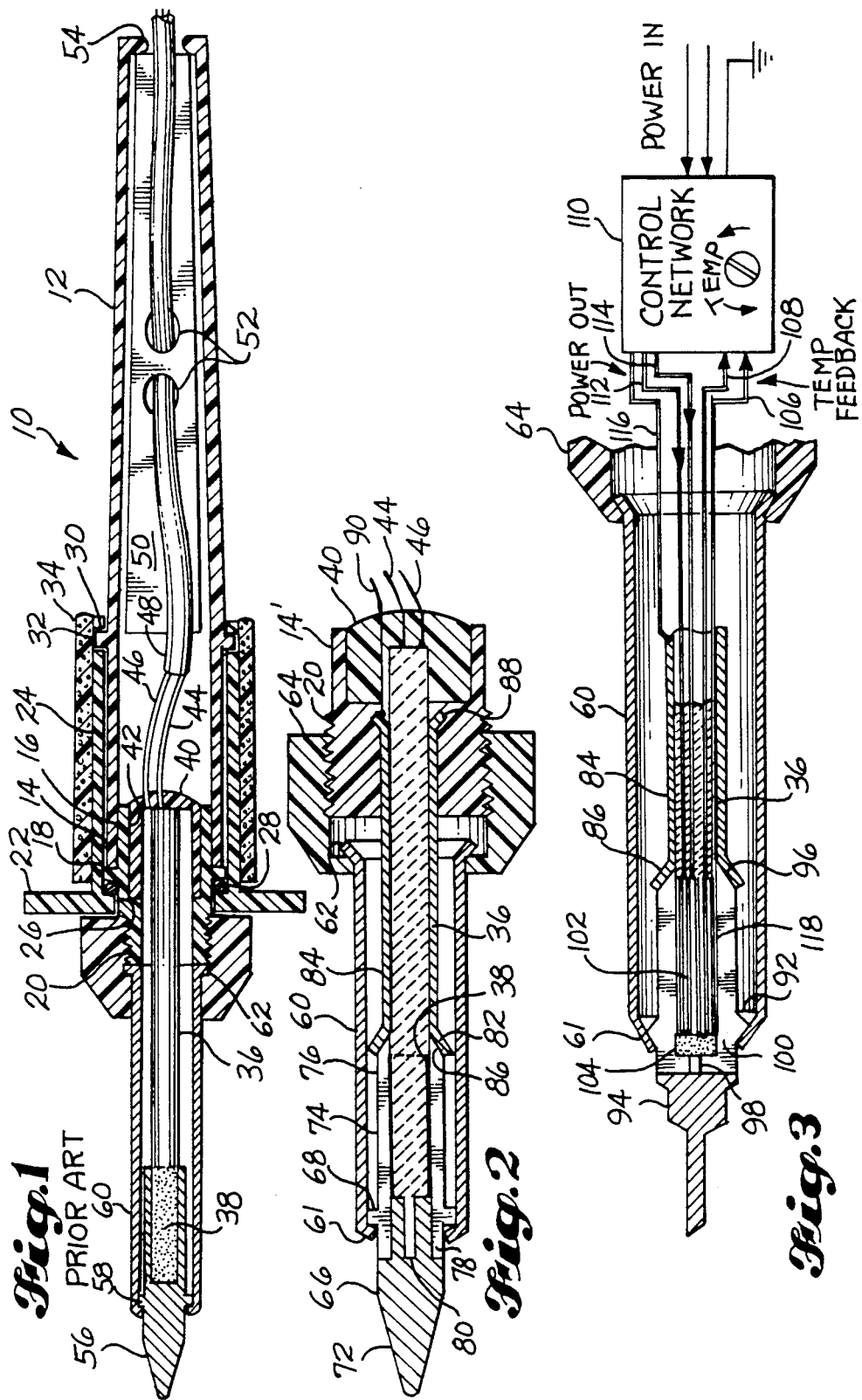

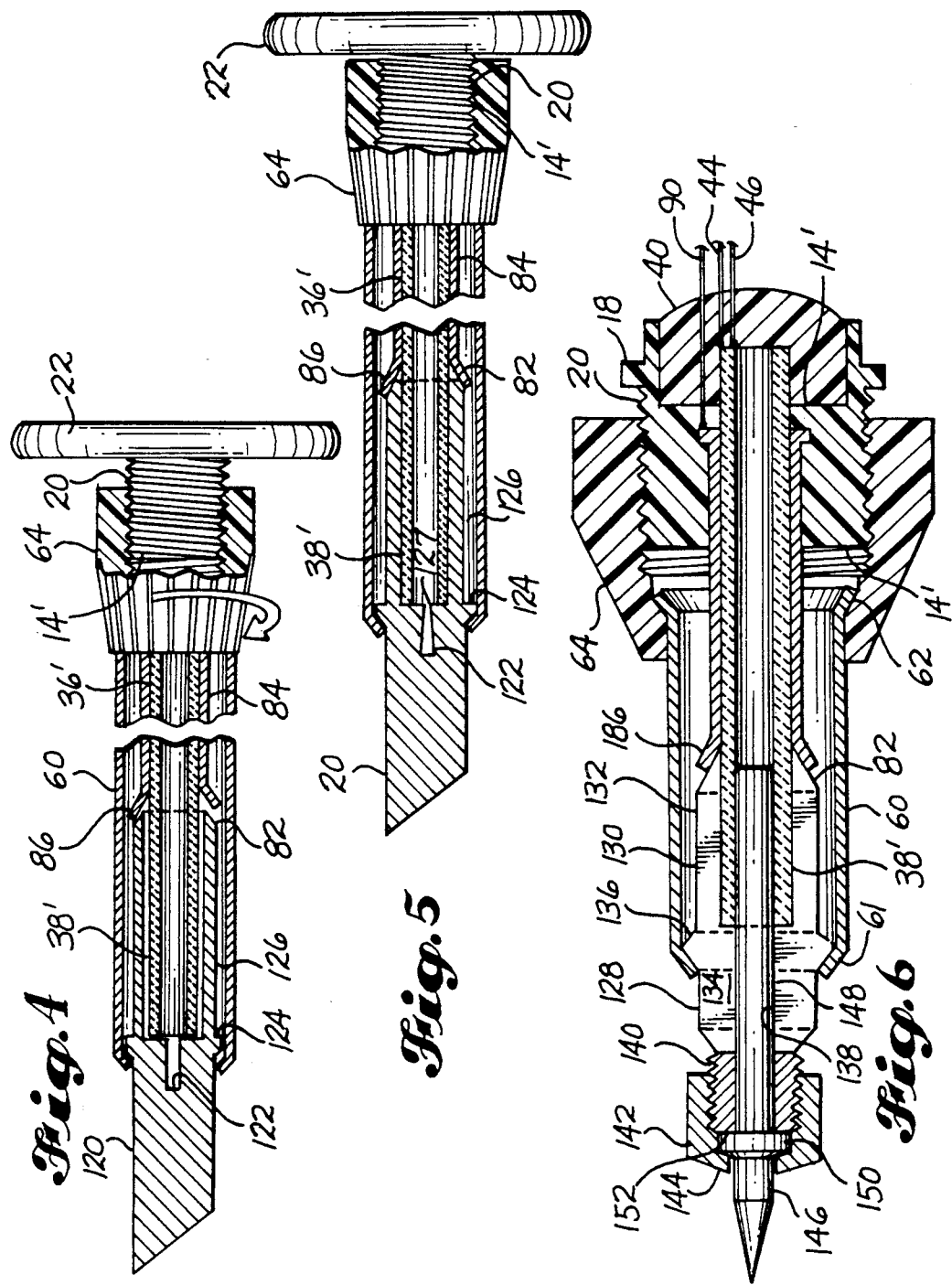

REPLACEABLE SOLDERING TIP ASSEMBLY

BACKGROUND OF THE INVENTION

This invention relates generally to electric soldering instruments and more specifically to replaceable soldering tips for hand held soldering irons.

In the current state of the soldering art where light weight, electrically efficient, precision temperature controlled, and versatile hand held soldering irons are used in electronic production, research and development, maintenance and repair, and hobbyist activities, it is routinely desirable to exchange soldering tips, for example, for purposes of replacement for wear, selection of shape for specific tasks, or selection for power handling capability.

A currently preferred configuration for such soldering requirements includes an elongated cylindrical ceramic rod or tube which is supported and projects forwardly from the soldering iron handle. The forward few centimeters of the ceramic body carries the electric heating element and temperature sensor means which may be a separate thermistor element or may be the heating element itself used in a time-share mode to sense temperature or a function of its electrical resistance. The electrical heating element is typically deposited as a very thin patterned layer onto the outer surface of the ceramic body.

It is then the general practice to fit a soldering tip over the heater portion of the rod in a manner to carry thermal energy from the heater to the forward, working end of the soldering tip. To maximize such thermal transfer, the skirt of the soldering tip extends snugly over the ceramic rod for approximately the length of its heater portion.

Obviously, the ceramic rod and especially the thin, deposited heating element are significantly fragile with respect to impact and abrasion, respectively. Accordingly, it is difficult to provide a snug fitting, slidingly removable soldering tip which is close fitting to provide maximum heat transfer into itself from the heating element while not subjecting the ceramic rod and heating element to damage when removing or replacing it. Furthermore, the problem is severely aggravated by the accumulation of corrosion and decomposition products on the inner surface of the soldering tip which reduce or destroy any of the designed small clearance between the heating rod and the soldering tip. In addition, these products are typically adhesive and may, under some circumstances, bind the tip and heater together. As a result, a tip designed for a snug but free fit over the ceramic heater rod will, after use, cause damage to the heater when one attempts to remove and replace it.

Prior art approaches to the problem typically comprise different attempts to optimize between 1) designing the tip for a snug, thermally efficient fit with its attendant risks of damage to the heater and 2) providing a safely loose fit with its attendant poor thermal transfer characteristic.

A second approach has been to provide some adjustment in the snugness of fit by providing a soldering tip with a skirt of relatively large inner diameter so that there is small risk of damaging the heater element by its replacement. Its thermal efficiency is then improved by splitting and slotting the base of the soldering tip skirt and providing a small peripheral clamp around the slotted base of the skirt so that a region of tight thermal contact is provided. This technique, however, provides only a small region of thermal contact and it is at the end of the soldering tip most remote from its working end. Furthermore, the clamp is often an awkward encumbrance for the operator to deal with during precision soldering tasks. In addition, the supply of suitable clamps and their removal and replacement constitute additional steps and cause their own complications when exchanging soldering tips.

Accordingly, it is an object of the present invention to provide a replaceable soldering tip assembly which is not subject to these and other disadvantages and disadvantages and limitations of the prior art.

It is another object to provide such a system in which the soldering tip has a maximum thermal energy transfer relation to the soldering heater without risk of damaging the latter during removal or replacement of the tip.

It is another object to provide such a tip assembly which requires no separate clamps or similar such devices to achieve good thermal contact between heater and tip.

It is another object to provide such a tip assembly in which the tip may be exceedingly easily replaced even if heavily corroded or spent.

It is another object to provide such a tip assembly which is rugged, simple, and which may be inexpensively manufactured with no regard for difficult machining or plating tolerances.

SUMMARY OF THE INVENTION

Briefly, these and other objects and advantages are achieved in accordance with the principles of the invention as embodied in a presently preferred example thereof by providing a hand held soldering instrument having a handle portion which supports and from which projects forwardly a ceramic heating rod body the forward end of which carries an electric heater element which may be a patterned resistive deposit on the cylindrical outer surface of the rod which is then protected with a thin ceramic layer. Extending protectively and snugly over the rear portion of the ceramic rod and also supported by the handle portion is a thin-walled metal sheath which terminates axially, at approximately the rearward end of the heater element, in a flared, forwardly outwardly diverging axially short cone-like surface.

A removable soldering tip is provided which has a forward, working tip end and a rear, base body portion which is centrally bored from its rear end such as to fit loosely over the heater element of the ceramic rod, the length of the bore defining a skirt being approximately the axial length of the heater element. The rear end of the skirt portion is terminated in a truncated conical edge converging rearwardly inwardly in a manner to engage in an inserting relation the outwardly diverging cone-like surface of the metal sheath.

Between the working tip end of the soldering tip and a point well forward of the forward end of the skirt forming bore in the body of the tip a camming or retaining collar is formed on the outer surface of the tip. A second, thin walled outer sheath is provided over the ceramic rod and skirt portion of the tip. The forward end of the outer sheath has a reduced inner diameter which is greater than that of the working tip portion of the soldering tip but less than that of the camming collar whereby when the outer sheath is forced rearwardly toward a threaded attachment provided at the forward end of the handle body, the collar is engaged radially compressively by the forward end of the outer sheath. The soldering tip is longitudinally slotted by a plurality, such as four, slits which extend through the rear end of the skirt and forwardly of the camming collar. Thus, when the slotted soldering tip is placed over the end of the heater rod in engagement with the outwardly flared forward end of the inner sheath, and the outer sheath is placed over the slotted, skirt portion and pulled rearwardly by its threaded attachment to the handle body, the rear slotted portions of the soldering tip are forced radially inwardly by their engagement with the outwardly flared end of the inner sheath; and the forward, slotted portions of the skirt are displaced inwardly by the engagement of the reduced diameter forward end of the outer sheath with the camming collar of the soldering tip.

It may be noted that the ceramic rod may be square or rectangular in cross section with corresponding geometry accorded to the soldering tip and its various holding means.

These and other features of this example of the invention and of other examples thereof will be best understood from the following detailed description of the invention taken in connection with the drawings.

THE DRAWINGS

FIG. 1 is a longitudinally sectioned view of a hand held electric soldering iron illustrating a replaceable soldering tip according to the prior art;

FIG. 2 is a similar view of the front end portion of a similar soldering instrument incorporating an example of the replaceable tip assembly combination of the present invention;

FIG. 3 is a similar view illustrating an alternative example of the invention;

FIGS. 4 and 5 are similar views in enlarged detail illustrating the steps of attaching a replaceable tip, constructed in accordance with the principles of the invention, to the remainder of a soldering iron combination; and FIG. 6 is a similar view illustrating another example of the combination of the present invention.

DETAILED DESCRIPTION OF PRESENTLY PREFERRED EMBODIMENTS

In FIG. 1, a hand held electric soldering instrument 10 is shown which exemplifies a current, state of the art modern tool providing the advantages heretofore known and expected of the best of such implements. The instrument includes a hollow handle body 12 which supports a base bushing 14 by fitting closely over its rear cylindrical body portion 16 and against an enlarged diameter retaining rim 18. The forward end of the base bushing 14 is a threaded portion 20 having a diameter reduced with respect to that of the rim 18.

A finger protecting collar 22 and skirt 24 element is shown disposed over the forward portion of the handle body 12. A central opening 26 provided therein at its forward end through which the threaded portion 20 of the base bushing is disposed. An elastomeric o-ring 28 placed over the threaded portion is disposed axially between the rear of the collar 22 and the forward shoulder of the retaining rim 18.

A cooperating set of bayonet, or the like, prongs 30 and slots 32 are provided respectively on the outer surface of the body 12 and the rear of the skirt 24 and function in a conventional manner to removably secure the body 12, the base bushing 14, and the collar 22, skirt 24 element together by compressing the o-ring 28 between the retaining rim 18 and the collar 22 as shown.

The collar 22 protects the operator's fingers from touching the forward, heated portions of the implement and elevate those portions away from the bench surface when the tool is resting horizontally thereon. The skirt 24 may be radially spaced somewhat from the outer surface of the body 12 so that heat therein will be insulated from the hand of the operator thereby further contributing to his comfort. In addition a removable foam elastomeric sleeve 34 may be disposed as shown over the skirt 24 to provide even further mechanical and thermal comfort to the operator.

To complete the fundamentals of this prior art example, a ceramic heating rod 36 is shown supported by the base bushing 14 and projecting in a cantilevered fashion forwardly thereof with a deposited resistive electric heating element 38 disposed over the forward few centimeters of its cylindrical surface. The heating rod 36 is secured to the base bushing 14 in this example by a quantity of suitable potting compound 40 molded within a large rear recess 42 of the bushing as shown. Electrical power to the heating element is supplied by a part of leads 44, 46 which feed through a conventional power cord 48 retained by a strain protective wafer 50 with its openings 52 through which the power cord passes and is protectively restrained against undesired longitudinal displacement. The cord 48 ultimately leaves the body 12 through an opening 54 and connects to a remote temperature control power unit, not shown, which may be of the character to use the resistance of the heating element 38 as a feedback parameter to control the power to the heating element and thereby its temperature.

At the forward end of the heating rod 36, and particularly contiguous to the heating element 38, a removable soldering tip 56 is shown disposed over the rod in a relatively close relation thereby to maximize the heat flow from the heating element to the soldering tip. In this example, the outer body of the soldering tip 56 is basically cylindrical with an enlarged diameter retaining rim 58 provided about its outer surface.

A protective, outer retaining sheath 60 extends over the ceramic rod 36 from a reduced diameter forward end 61 which bears rearwardly against the retaining rim 58 to hold the soldering tip 56 against the front end of the heating element for mechanical rigidity as well as for thermal energy transfer thereto. The rear of the metallic sheath 60 is flared outwardly to an enlarged diameter portion 62 which is equal to or less than that of the threaded portion 20. A retaining nut 64 having a reduced diameter forward lip engages the flared portion 62 of the sheath and is threaded onto the portion 20 in a manner to compress the soldering tip onto the heating rod. The resulting configuration of sheath 60, nut 64, and base bushing 14 provides a mechanically strong, simple, and rugged arrangement for a soldering tool having a removable soldering tip; however, the removal process and problems of vulnerability of the ceramic rod and heater while attempting to maintain satisfactory thermal performance exist as severe disadvantages as discussed above.

In FIG. 2 an example of the replaceable tip assembly of the invention is illustrated in combination with as much as possible of the prior art implement shown in FIG. 1. For example, the retaining nut 64, the threaded portion of a base bushing 14', the ceramic heating rod 36 with its deposited heater element 38, electrical leads 44, 46, and outer retaining sheath 60 may, for purposes of clarity and simplification, be considered to be substantially identical to those like-numbered elements of FIG. 1. A replaceable soldering tip 66 with its retaining rim 68 may in some overall respects be quite similar to the soldering tip 56 and retaining rim 48 of FIG. 1.

The soldering tip 66 includes a body portion 70 having a forward, working tip 72 and a rear skirt portion 74 formed by a bore from its rear end 76, the diameter of the bore being sufficiently larger than that of the heater element 38 that it may readily be slid thereover, to install it or remove it, with no danger of scratching, scraping, or abrading the ceramic rod or the heater element. To provide good thermal contact between the soldering tip and the heater element, the soldering tip is, in this example, slotted from its rear edge to a point axially forward of the retaining rim 68 by a pair of radially orthogonal slots 78, 80. The forward edge of the retaining rim 68 and the inner surface of the reduced diameter forward end 61 of the outer retaining sheath 60 have a tapered relation such that when the sleeve is pulled rearwardly by the retaining nut 64, a component of the force or the rim is a radially inward force on the slotted portions of the tip 66 causing them to be displaced inwardly against the outer surface of the heating element 38.

In addition, the rear edge of the skirt portion 74 is formed with a tapered, or beveled, cone-like surface 82 converging rearwardly radially inwardly. An inner metallic sheath 84 is affixed firmly over the ceramic rod 36 rearwardly of its heater element portion 38 and is terminated at its forward end by an outwardly forwardly diverging cone-like flared surface 86. Its rear end 88 may also be flared as shown to enhance its bonding to the molded base bushing 14'. It should be noted that in this example both the rod 36 and its protective metal sheath 84 are integrally secured together and rigidly carried by their connection to the bushing 14' and the molded potting material 40. The sheath, being in contact with the soldering tip and outer metallic sheath may, when desired, carry a ground connection for the soldering tool to its external power circuit, not shown, through a ground lead 90 electrically affixed to the rear of the inner sheath 84.

The length of the soldering tip 66, particularly its dimension from the front edge of its retaining rim 68 to its beveled rear edge 82, the length of the outer, retaining sheath 60, particularly its dimension between its inwardly flared front end and its outwardly flared rear end, the axial position of the flared front end 86 of the inner sheath 84, and the axial travel of the retaining nut 64 over the threaded portion 20 of the base bushing 14' are selected such that when 1) the soldering tip 66 is placed over the front end of the heating rod with its tapered end 82 inserted into the flared end 86 of the sheath 84, and 2) the outer sheath 60 is placed over the soldering tip with its forward end 61 pressing rearwardly and inwardly against the retaining rim 68 and drawn rearwardly by the retaining nut 64 threaded onto the bushing 14', the forward portions of the slotted skirt are pressed inwardly over the heater element by the reaction of the rim 68 against the sheath 60 while the rear of the slotted portions are pressed inwardly over the heater element by the reaction of the tapered surface 82 against the flared surface 86 of the sheath 84.

In FIG. 3, an example of the invention is illustrated in which the same relationships between the inwardly flared end 61 of the outer sheath 60, the outwardly flared end 86 of the inner sheath 84, the tapered forward edge of a retaining rim 92 of a replaceable soldering tip 94 and its tapered rear edge 96 cause a circumferential compression of the slotted soldering tip along its entire skirted length when the outer sheath is forced rearwardly by the retaining nut 64. The slots 98, 100 in the soldering tip again are provided diametrically across the body of the tip in an orthogonally related manner extending forwardly of the retaining rim 92.

In this example, the heater element 102 on its supporting rod 36 is independent of a temperature sensor 104 disposed on and carried by the front end of the ceramic rod 36. In this arrangement, separate feedback leads 106, 108 are provided for connecting the sensor 104 to a control network 110 which is of the character to provide power through a set of leads 112, 114, and a ground line 116, to a heater element 118 which, as in the previous example, may be a resistive network deposited on the surface of the forward portion of the rod 36.

Referring to FIGS. 4 and 5 an example of the invention is illustrated in which the ceramic heating rod 36' is a hollow tube configuration while its heater element 38' and its relationship with the outer sleeve 60, base bushing 14', and collar 22 is essentially the same as in the previous examples. The soldering tip 120 is of a heavy duty character and, in this example is provided with three slots 122, one only showing in the view of FIG. 4 or 5. The slots extend forwardly of the retaining rim 124. In FIG. 4, the assembly of sleeves 60, 84, soldering tip 120, and nut 64, and bushing 14' are shown loosely together with the slotted skirt 126 of disposed over the heater element 38'. In FIG. 5, the retaining nut 64 is shown fully threaded onto the bushing 14' forcing the full length of the slotted skirt 126 to be compressed snugly over the heating element in excellent thermal energy exchange relation therewith. It may be noted that this circumferential, inward displacement of the slotted skirt portions causes the width of the slot to decrease and create the crimped shape shown at its forward end 127.

In FIG. 6, an example of the invention is illustrated in which a soldering tip base 128 is provided with many of the essential features of the replaceable soldering tips of the previous examples: the rear body portion 130 is bored to form a skirt 132 which would fit loosely over the heater element 38' on the forward end of the hollow ceramic rod 36'. Again the body of the soldering tip base is slotted by two longitudinal, orthogonally related slots one of which, slot 134, is shown in the figure and which extend forwardly of a retaining rim 136 formed about the outer cylindrical surface of the tip base 128. The relation between the inner sheath 84, its flared forward end 86, the outer retaining sheath 60, its reduced diameter forward end 61, its flared rear end 62, the retaining nut 64, and the threaded portion 20 of the base bushing 14' in compressing the slotted portions of the skirt 132 snugly about the heater element 38' is the same as described above in the discussion and description of the previous figures.

The soldering tip base 128 is, in this example formed with a central bore 138 through its entire length having a diameter approximately equal to that of the inner diameter of the hollow ceramic rod, or tube, 36'. The front end of the tip base 128 is provided with threads 140 over which may be fastened a tip retaining nut 142 having a reduced diameter retaining lip 144 at its forward end.

A replaceable working tip 146 is shown having an elongated shank body portion 148 the diameter of which is approximately equal to that of the bore 138. Its length is such as to extend axially essentially coextensively with the heater element 38'. A retaining collar 150 is provided on the forward portion of the tip 146 which is engaged by the retaining lip 144 of the nut 142 to compress the rear of the collar tightly against the forward edge 152 of the tip base 128. The replaceable working tip 148 is thus in excellent thermal energy exchange relation with the tip base 128 and, in addition, receives significant additional heat directly from the heater element 38' by virtue of its disposition fully therewithin as shown in the figure.

In the embodiment of FIG. 6, the replaceable working tip 148 may have any of a very large variety of geometrical configurations and metallic compositions for specific soldering tasks and may be exceedingly readily exchange simply by unscrewing the forward nut 142, withdrawing the working tip, and reinserting a different one. At the same time, the tip base 130 retains all the advantages discussed above of fitting sufficiently loosely over the heating element during a removal or replacement step and yet being compressed radially very simply against the heater element during use of the implement.

Again, it is to be noted that although for clarity and simplification other shapes are not explicitly shown, the ceramic rod and the heating element may be square, rectangular, blade-like, or elliptical in cross section with corresponding geometrical shapes for the associated retaining and camming portions of the assembly.

There have thus been disclosed and described a number of embodiments of the invention which exhibit the advantages and achieve the objects set forth earlier herein.

I claim:

1. Replaceable soldering tip assembly comprising:
   A. handle base means having a longitudinal axis and including a threaded bushing coaxially aligned therewith;
   B. ceramic heating rod means supported centrally by and extending forwardly from said handle base means;
   C. an electrically resistive heating element disposed on the outer surface of said rod means contiguously to its forward end;
   D. an inner sheath disposed snugly about said rod means and covering the major rearward portion thereof,
   said inner metal sheath terminating at its forward end in an outwardly flared short cone-like surface disposed axially contiguously to the rear end of said heating element
   E. soldering tip means having an elongated body bored from the rear to form a skirt portion adapted in length and diameter to fit loosely over said heating element,
      a. the rear edge of said skirt portion having an inwardly tapered, cone-like surface adapted to fit within said flared cone-like surface of the forward end of said inner metal sheath,
      b. the body of said soldering tip means having retaining rim means disposed thereabout well forwardly of said skirt portion rear edge,
      c. the body of said soldering tip means having a plurality of axially disposed slots provided therein extending from said rear edge, through said skirt portion, and forwardly of said retaining rim means; and
   F. outer sheath means disposed over said ceramic heating rod means and said retaining rim and skirt portion and having threaded nut means disposed at its rearward end for fastening engagement with said threaded bushing and having a reduced diameter forward end for engaging said retaining rim and urging it rearwardly and inwardly when said nut means is threaded rearwardly onto said threaded bushing.

2. Replaceable soldering tip assembly comprising:
   A. ceramic support rod means having forward and rear ends;
   B. heating element means having forward and rear ends and being carried by said forward end of said rod means;
   C. soldering tip means having an essentially cylindrical body forming a hollow, skirted rear portion and a working tip front portion,
      a. the length and inner diameter dimensions of said skirted portion being slightly larger than those of said heating element means and being disposed thereover in heat exchange relation therewith
      b. said soldering tip body having an enlarged diameter retaining rim formed about its outer diameter axially contiguously to the front end of said heating element means
      c. said soldering tip body being provided with a plurality of slots extending through its rear edge forwardly to a point axially forward of said retaining rim;
   D. inner sheath means disposed snugly about said rod means and extending rearwardly to a point contiguous to its said rear end and forwardly to a point contiguous to said rear end of said heating element, the forward end of said inner sheath means being terminated in an outwardly flared, short truncated cone-like surface for receiving the rear edge of said skirted portion of said soldering tip body;
   E. soldering tool base means disposed about the rear of said rod and inner sheath means for supporting them integrally and forwardly in a cantilevered relation and having an outer, forwardly exposed threaded bushing disposed coaxially with said rod means; and
   F. outer supporting sheath means having female threaded fastening means disposed at its rear end for engaging said threaded bushing and being disposed over said rod means, heating element, and skirted portion of said soldering tip body and having a reduced diameter forward end grasping said retaining rim and urging the slotted skirted portion thereof rearwardly and inwardly and the rear edge of said skirted portion within said cone-like surface of the forward end of said inner sheath rearwardly and inwardly when said threaded fastening means is forcefully threaded onto said threaded bushing, whereby the full length of said skirted portion over said heating element is compressed radially inwardly tightly thereagainst to maximize said heat exchange relation.

3. Replaceable soldering tip assembly comprising:
   A. handle base means having a longitudinal axis and including a threaded bushing coaxially aligned therewith;

B. ceramic heating rod means supported centrally by and extending forwardly from said handle base means;
C. an electrically resistive heating element disposed on the outer surface of said rod means contiguously to its forward end;
D. an inner sheath disposed snugly about said rod means and covering the major rearward portion thereof,
   said inner metal sheath terminating at its forward end in an outwardly flared short surface disposed axially contiguously to the rear end of said heating element
E. soldering tip means having an elongated body bored from the rear to form a skirt portion adapted in length and diameter to fit loosely over said heating element,
   a. the rear edge of said skirt portion having an inwardly tapered, surface adapted to fit within said flared surface of the forward end of said inner metal sheath,
   b. the body of said soldering tip means having retaining rim means disposed thereabout well forwardly of said skirt portion rear edge,
   c. the body of said soldering tip means having a plurality of axially disposed slots provided therein extending from said rear edge, through said skirt portion, and forwardly of said retaining rim means; and
F. outer sheath means disposed over said ceramic heating rod means and said retaining rim and skirt portion and having threaded nut means disposed at its rearward end for fastening engagement with said threaded bushing and having a reduced diameter forward end for engaging said retaining rim and urging it rearwardly and inwardly when said nut means is threaded rearwardly onto said threaded bushing.

* * * * *